US011858333B2

United States Patent
Toda et al.

(10) Patent No.: US 11,858,333 B2
(45) Date of Patent: Jan. 2, 2024

(54) VEHICLE BODY STRUCTURE

(71) Applicant: MAZDA MOTOR CORPORATION, Hiroshima (JP)

(72) Inventors: Isao Toda, Hiroshima (JP); Takayuki Kimura, Hiroshima (JP); Takehiro Kamei, Hiroshima (JP); Hiroshi Tanaka, Hiroshima (JP); Haruo Ohe, Hiroshima (JP); Masaya Hiramatsu, Hiroshima (JP); Masanobu Fukushima, Hiroshima (JP); Takao Fukuda, Hiroshima (JP); Hironobu Hashiguchi, Hiroshima (JP); Hiroyuki Baba, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 220 days.

(21) Appl. No.: 17/585,318

(22) Filed: Jan. 26, 2022

(65) Prior Publication Data

US 2022/0314771 A1      Oct. 6, 2022

(30) Foreign Application Priority Data

Mar. 30, 2021   (JP) .................................. 2021-057940

(51) Int. Cl.
*B60K 1/04*     (2019.01)
*B62D 25/20*    (2006.01)
*B60N 2/005*    (2006.01)

(52) U.S. Cl.
CPC ................ *B60K 1/04* (2013.01); *B62D 25/20* (2013.01); *B60K 2001/0438* (2013.01); *B60N 2/005* (2013.01)

(58) Field of Classification Search
CPC .............. B60K 1/04; B60K 2001/0411; B60K 2001/0422; B60K 2001/0427; B60K 2001/0433; B60K 2001/0438; B60N 2/005; B60N 2/015; B62D 25/20; B62D 25/2036
See application file for complete search history.

(56) References Cited

U.S. PATENT DOCUMENTS

| 4,216,839 A | * | 8/1980 | Gould ..................... B60L 50/66 267/221 |
| 2009/0186266 A1 | * | 7/2009 | Nishino .................. B60L 50/66 429/120 |

(Continued)

FOREIGN PATENT DOCUMENTS

| CN | 102938450 A | 2/2013 |
| JP | 2019-018686 A | 2/2019 |

*Primary Examiner* — Jeffrey J Restifo
(74) *Attorney, Agent, or Firm* — Studebaker & Brackett PC (57) ABSTRACT

A vehicle body structure includes a front floor panel provided on a vehicle front side and a rear floor panel provided at the rear of the front floor panel. The front floor panel is positioned higher than the rear floor panel. A first battery arrangement portion is provided long in a vehicle front-rear direction at a center portion of the front floor panel in the vehicle width direction. A second battery arrangement portion is provided outside the first battery arrangement portion in a vehicle width direction below the front floor panel. An upper portion of the first battery arrangement portion is positioned higher than an upper portion of the second battery arrangement portion.

13 Claims, 7 Drawing Sheets

(56) References Cited

U.S. PATENT DOCUMENTS

| | | | | |
|---|---|---|---|---|
| 2009/0197154 | A1* | 8/2009 | Takasaki | H01M 10/625 429/83 |
| 2012/0006607 | A1* | 1/2012 | Ohashi | B60L 58/40 180/65.31 |
| 2014/0338999 | A1* | 11/2014 | Fujii | B60L 58/26 180/68.5 |
| 2017/0203668 | A1* | 7/2017 | Enning | B60L 50/64 |
| 2017/0271727 | A1* | 9/2017 | Ito | B60L 50/64 |
| 2018/0111483 | A1* | 4/2018 | Nakayama | B60L 50/64 |
| 2018/0111500 | A1* | 4/2018 | Ogaki | H01M 10/6568 |
| 2018/0244142 | A1* | 8/2018 | Takayanagi | B62D 25/087 |
| 2018/0345778 | A1* | 12/2018 | Yamanaka | B60K 1/04 |
| 2018/0345817 | A1* | 12/2018 | Yamamoto | H01M 10/6568 |
| 2019/0009661 | A1* | 1/2019 | Okamura | H01M 50/249 |
| 2019/0232773 | A1* | 8/2019 | Kasai | B62D 21/157 |
| 2019/0263276 | A1* | 8/2019 | Otoguro | B62D 25/20 |
| 2019/0276081 | A1* | 9/2019 | Otoguro | B60K 1/04 |
| 2019/0291558 | A1* | 9/2019 | Goto | H01M 50/209 |
| 2020/0343502 | A1* | 10/2020 | Iwata | B60L 50/64 |
| 2020/0376947 | A1* | 12/2020 | Yamada | B60K 1/04 |
| 2020/0376948 | A1* | 12/2020 | Yamada | B62D 25/20 |
| 2021/0114448 | A1* | 4/2021 | Meyer | H02K 9/197 |
| 2021/0300480 | A1* | 9/2021 | Kohara | B60K 15/063 |
| 2022/0069405 | A1* | 3/2022 | Choi | B60L 3/0007 |
| 2022/0185088 | A1* | 6/2022 | Zhang | H01M 50/244 |
| 2022/0223960 | A1* | 7/2022 | Boehm | B60K 1/04 |
| 2022/0231368 | A1* | 7/2022 | Wang | H01M 50/262 |
| 2022/0281543 | A1* | 9/2022 | Breu | B62D 25/087 |
| 2022/0297522 | A1* | 9/2022 | Nicholls | B60L 50/66 |
| 2022/0314770 | A1* | 10/2022 | Toda | B62D 25/2009 |
| 2022/0314771 | A1* | 10/2022 | Toda | B60K 1/04 |
| 2022/0314774 | A1* | 10/2022 | Toda | B60N 2/015 |
| 2022/0371419 | A1* | 11/2022 | Fernandez-Galindo | B60K 1/04 |
| 2022/0379705 | A1* | 12/2022 | Kamei | B62D 25/2036 |
| 2022/0379706 | A1* | 12/2022 | Hiramatsu | B62D 21/11 |
| 2022/0379963 | A1* | 12/2022 | Kamei | B62D 21/15 |
| 2022/0379966 | A1* | 12/2022 | Kamei | B62D 25/025 |
| 2022/0388384 | A1* | 12/2022 | Alwan | B60K 1/04 |
| 2022/0393268 | A1* | 12/2022 | Marpu | H01M 10/6555 |
| 2023/0095674 | A1* | 3/2023 | Inami | B60L 50/66 180/65.1 |

* cited by examiner

FRONT ⟵⟶ REAR

FIG.6

FRONT ⟵⟶ REAR

VEHICLE BODY STRUCTURE

CROSS-REFERENCE TO RELATED APPLICATION

This application claims priority to Japanese Patent Application No. 2021-057940 filed on Mar. 30, 2021, the entire disclosure of which is incorporated by reference herein.

BACKGROUND

The present disclosure relates to a vehicle body structure including a floor panel, for example.

For example, in a motor vehicle having a traction motor, a battery unit for supplying electric power to the traction motor is mounted. Such a battery unit has a large capacity to extend the cruising range of the traction motor (e.g. see Japanese Unexamined Patent Publication No. 2019-18686). In the vehicle body structure of Japanese Unexamined Patent Publication No. 2019-18686, the battery unit is mounted below a floor panel extending horizontally from a front portion to a rear portion.

SUMMARY

The cruising range largely depends on a battery capacity, and there has been a demand for increasing the capacity for mounting the battery. On this point, when batteries are mounted across the entirety below the floor panel as in Japanese Unexamined Patent Publication No. 2019-18686, the entirety of the floor panel needs to be at a high position, which may lead to a problem on ensuring of an internal space of a vehicle interior. Particularly, for keeping the entire height of the vehicle low, when the entirety of the floor panel is raised, this leads not only to a decrease in a space above a head but also to raising of a portion on which feet are placed due to raising of a seating position. As a result, an adverse effect is on comfort.

In view of the foregoing background, it is an object of the present disclosure to ensure an internal space of a vehicle interior while ensuring a great capacity for mounting the batteries.

To achieve the above-described object, a first aspect of the present disclosure may premise a vehicle body structure of a motor vehicle including a floor panel forming a floor surface of a vehicle interior, a traction motor, and batteries that supply electric power to the traction motor. The floor panel includes a front floor panel provided on a vehicle front side, and a rear floor panel provided at the rear of the front floor panel. The front floor panel is positioned higher than the rear floor panel. A first battery arrangement portion in which the batteries are arranged is provided to extend in a vehicle front-rear direction at a center portion of the floor panel in the vehicle width direction. A second battery arrangement portion in which the batteries are arranged is provided outside the first battery arrangement portion in a vehicle width direction below the front floor panel. An upper portion of the first battery arrangement portion is positioned higher than an upper portion of the second battery arrangement portion.

According to this configuration, the batteries can be mounted in both the first battery arrangement portion and the second battery arrangement portion. In this case, since the upper portion of the first battery arrangement portion at the center portion in the vehicle width direction is positioned higher than the upper portion of the second battery arrangement portion, the number of batteries mountable in the first battery arrangement portion can be increased, and accordingly, the capacity for mounting the batteries can be increased. In this case, the center portion in the vehicle width direction corresponds to, e.g., a portion between a driver seat and a passenger seat, and therefore, even if the height of the first battery arrangement portion at this portion is high, it is less likely to feel an internal space of a vehicle interior as a narrow space. On the other hand, the second battery arrangement portion corresponds to the outside of the first battery arrangement portion in the vehicle width direction, i.e., a portion where a seat is arranged and a portion where feet are placed, and therefore, although it is likely to feel the internal space of the vehicle interior as a narrow space if the height of such a portion is high, a sufficient internal space of the vehicle interior can be ensured because the height of the second battery arrangement portion is relatively low in this configuration.

A second aspect of the present disclosure further includes a pair of right and left side sills arranged to extend in a front-rear direction at both end portions of the floor panel in a vehicle width direction, and a pair of right and left pillars each extending upward from the pair of right and left side sills. The second battery arrangement portion is provided inside the vicinity of the pillars in the vehicle width direction below the floor panel.

According to this configuration, the vicinity of the relatively highly-rigid pillars of the vehicle body is a portion having only a small amount of inward deformation in the vehicle width direction upon lateral collision, and the second battery arrangement portion is provided inside the vicinity of the pillars in the vehicle width direction. Thus, the impact load input to the batteries arranged in the second battery arrangement portion is reduced.

In a third aspect of the present disclosure, a heel rest portion for placing a heel of a pedal operator operating a pedal provided at the motor vehicle is provided on the front floor panel.

According to this configuration, the front floor panel for placing the heel of the pedal operator is positioned higher than the rear floor panel. Thus, the heel of the pedal operator is placed at a high position. This results in a small angle between a lower leg of the pedal operator and the front floor panel, which leads to small up-down component force input from the heel upon pedal operation. Thus, pedal operability is improved.

Moreover, the second battery arrangement portion is provided below the front floor panel arranged thereabove, and therefore, a space below the front floor panel can be effectively utilized without being a dead space. Thus, a battery with a great capacity can be mounted.

A fourth aspect of the present disclosure further includes a floor tunnel portion bulging upward at a center portion of the floor panel in the vehicle width direction. The first battery arrangement portion is provided inside the floor tunnel portion.

According to this configuration, the inside of the floor tunnel portion can be effectively utilized.

In a fifth aspect of the present disclosure, the floor panel includes a rear-seat-side floor panel provided at a rear of the rear floor panel and fixed to a rear seat. A rear battery arrangement portion in which the batteries are arranged is provided below the rear-side-side floor panel. An upper portion of the first battery arrangement portion is positioned higher than an upper portion of the rear battery arrangement portion.

According to this configuration, since the batteries can be mounted in the rear battery arrangement portion provided below the rear-seat-side floor panel, the capacity for mounting the batteries is further increased. Since the height of the rear battery arrangement portion is lower than the height of the first battery arrangement portion, a wide internal space for a rear seat occupant in the vehicle interior can be ensured.

In a sixth aspect of the present disclosure, a rear portion of the first battery arrangement portion extends to the rear battery arrangement portion.

According to this configuration, since the first battery arrangement portion extends in the vehicle front-rear direction, the number of batteries arrangeable in the first battery arrangement portion can be increased.

A seventh aspect of the present disclosure may premise a vehicle body structure of a motor vehicle including a floor panel forming a floor surface of a vehicle interior, a traction motor, and batteries that supply electric power to the traction motor. The floor panel includes a front panel portion provided on a vehicle front side, and a rear panel portion provided at the rear of the front panel portion. The front panel portion is positioned higher than the rear panel portion. A first battery arrangement portion in which the batteries are arranged is provided to extend in a vehicle front-rear direction at a center portion of the front floor panel in the vehicle width direction. A second battery arrangement portion in which the batteries are arranged is provided outside the first battery arrangement portion in a vehicle width direction below the front floor panel. An upper portion of the first battery arrangement portion is positioned higher than an upper portion of the second battery arrangement portion.

According to this configuration, one configured such that the floor panel is integrally formed from the front portion to the rear portion can provide features and advantages similar to those of the first aspect.

As described above, the upper portion of the first battery arrangement portion provided at the center portion in the vehicle width direction is positioned higher than the upper portion of the second battery arrangement portion provided outside the first battery arrangement portion in the vehicle width direction, the internal space of the vehicle interior can be ensured while a great capacity for mounting the batteries is ensured.

DETAILED DESCRIPTION

An embodiment of the present disclosure will be described in detail below with reference to the drawings. Note that the following description of the preferred embodiment is only an example in nature, and is not intended to limit the scope, applications or use of the present disclosure.

Figure 1:
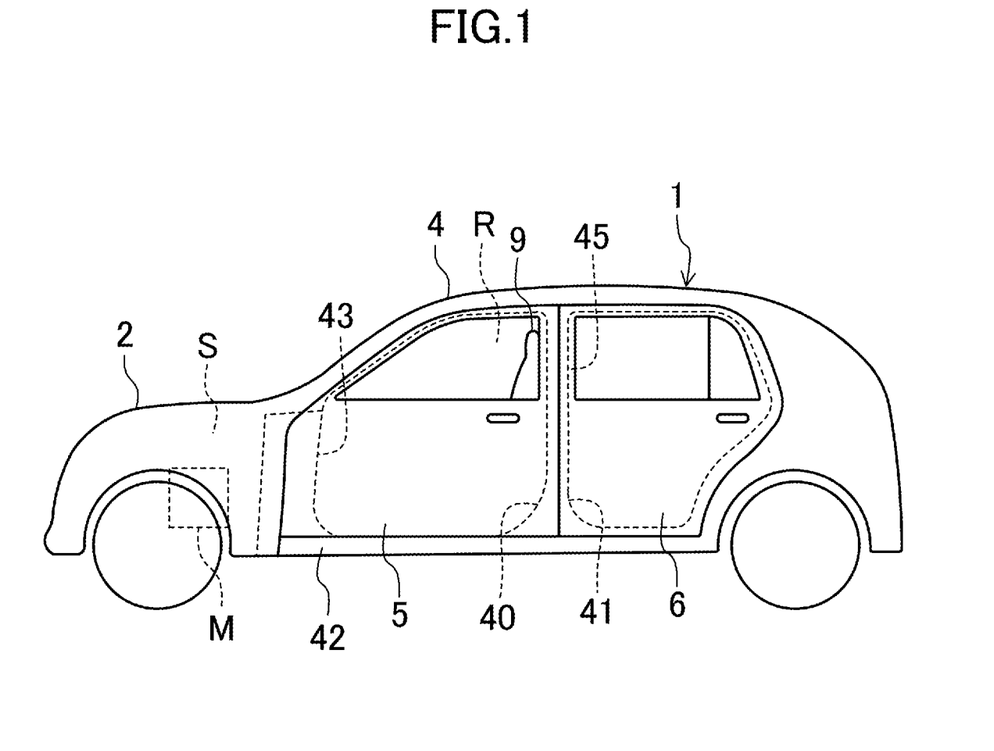
FIG. 1 is a side view of a motor vehicle of an embodiment of the present disclosure.

FIG. 1 is a left side view of a motor vehicle 1 of an embodiment of the present disclosure. The motor vehicle 1 is a so-called passenger car. Note that in the description of this embodiment, the front side of the vehicle is simply referred to as "front," the rear side of the vehicle is simply referred to as "rear," the right side of the vehicle is simply referred to as "right," and the left side of the vehicle is simply referred to as "left." A right-left direction of the vehicle is a vehicle width direction.

In a front portion of the motor vehicle 1, a power house S is provided. In the power house S, a power train (not shown) including a traction motor M etc. is stored. Thus, the power house S can also be referred to as, e.g., a power train storage compartment or a motor room. The motor vehicle 1 may be an electric motor vehicle or a hybrid motor vehicle (including a plug-in hybrid motor vehicle). In a case where the motor vehicle 1 is the electric motor vehicle, the traction motor M is mounted in the power house S. In a case where the motor vehicle 1 is the hybrid motor vehicle, the traction motor M and a not-shown internal combustion engine (an engine) are mounted in the power house S. Further, although not shown in the figure, the traction motor may be mounted at a rear portion of the motor vehicle 1, or may be an in-wheel motor mounted inside a wheel.

Provided above the power house S is a hood 2. The motor vehicle 1 may be such a front-engine rear-drive vehicle (hereinafter referred to as an FR vehicle) that an engine, a traction motor M, etc. mounted in a power house S drive rear wheels or such a front-engine front-drive vehicle (hereinafter referred to as an FF vehicle) that an engine, a traction motor M, etc. mounted in a power house S drive front wheels. In addition to the FR vehicle and FF vehicle, the motor vehicle 1 may also be a 4-wheel drive vehicle that drives four wheels.

Figure 2:
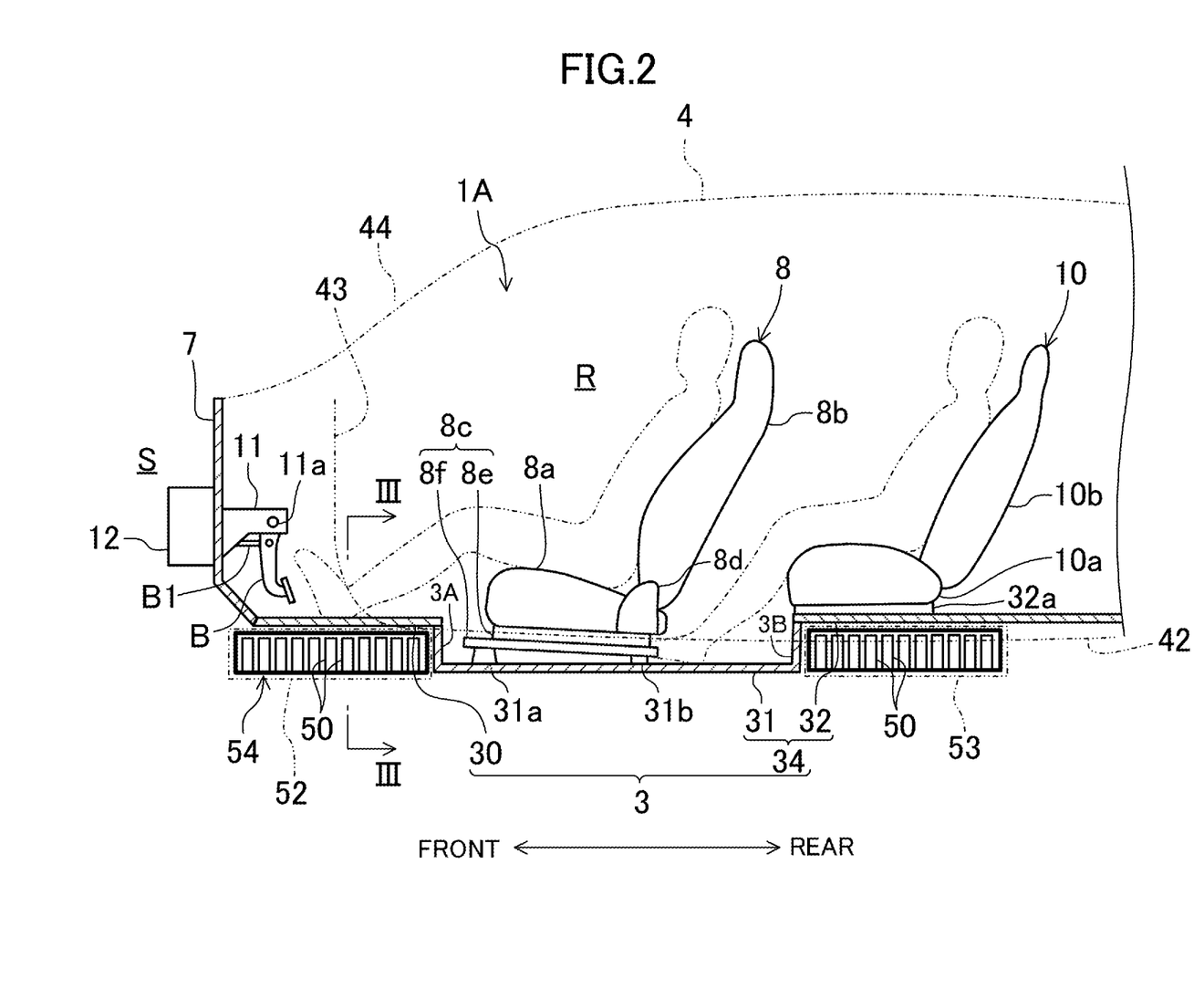
FIG. 2 is a partial cross-sectional view of a dash panel and a floor panel of the motor vehicle, FIG. 2 showing the position of a brake pedal.

In the motor vehicle 1, a vehicle interior R is provided at the rear of the power house S, as shown in FIG. 2. A bottom surface of the vehicle interior R is formed by a floor panel 3, and therefore, a space above the floor panel 3 is the vehicle interior R. A roof 4 is provided above the vehicle interior R. Further, as shown in FIG. 1, a front door 5 and a rear door 6 are arranged in an openable/closable manner at a left portion of the motor vehicle 1. Note that a front door and a rear door are also arranged in an openable/closable manner on the right side of the motor vehicle 1, although not shown in the figure.

As shown in FIG. 2, the motor vehicle 1 has a vehicle body structure 1A of the present disclosure. Although the vehicle body structure 1A includes the floor panel 3 and a dash panel 7, the dash panel 7 may be a member not forming the vehicle body structure 1A of the present disclosure. A member dividing the vehicle interior R and the power house S from each other in the front-rear direction is the dash panel 7. The dash panel 7 is made of, e.g., a steel plate, and extends not only in the right-left direction but also in the up-down direction. A lower portion of the dash panel 7 is inclined or curved so as to be positioned rearward toward a lower end portion thereof, and a lower end portion of the dash panel 7 is connected to a front end portion of the floor panel 3. Thus, the floor panel 3 is provided so as to extend rearward from the lower end portion of the dash panel 7.

In this embodiment, the right side of the vehicle interior R is a driver seat side, and the left side of the vehicle interior R is a passenger seat side. FIG. 2 is a cross-sectional view of the driver seat side of the motor vehicle 1, and shows the cross sections of the floor panel 3 and the dash panel 7 and a schematic structure of a driver seat 8 and a rear seat 10 attached to the floor panel 3 as well as a brake pedal B attached to the dash panel 7. While the driver seat 8 is provided on the right side of a center portion of the vehicle interior R in the right-left direction, a passenger seat 9 (shown in FIG. 1) is provided on the left side of the center portion of the vehicle interior R in the right-left direction. Note that the present disclosure is not limited to above, and the driver seat side may be on the left side of the vehicle interior R and the passenger seat side may be on the right side of the vehicle interior R. Further, there may be two or more rows of rear seats in the vehicle interior R.

Figure 3:
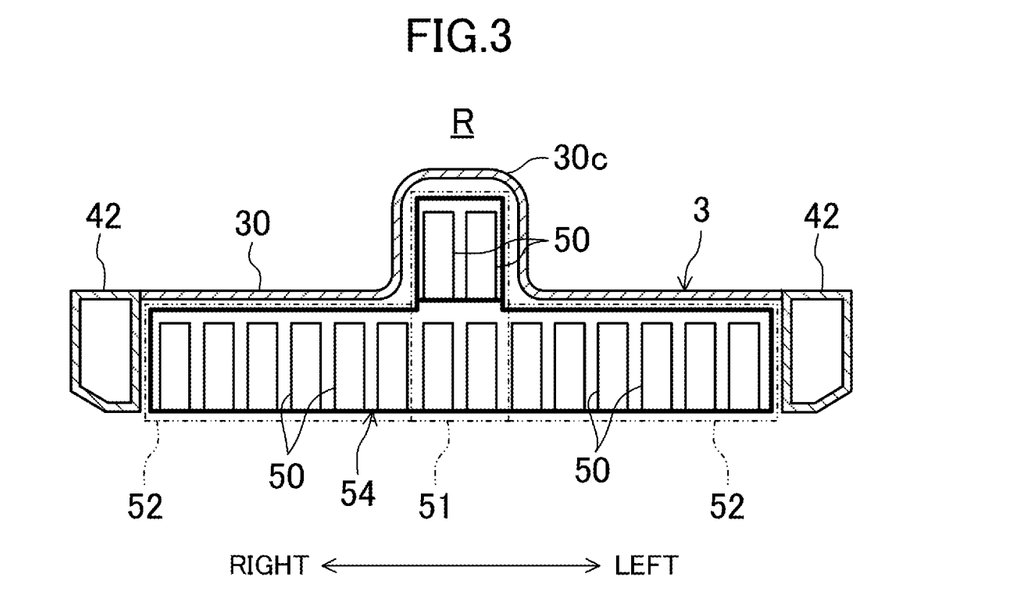
FIG. 3 is a cross-sectional view taken along line in FIG. 2.
Figure 4:
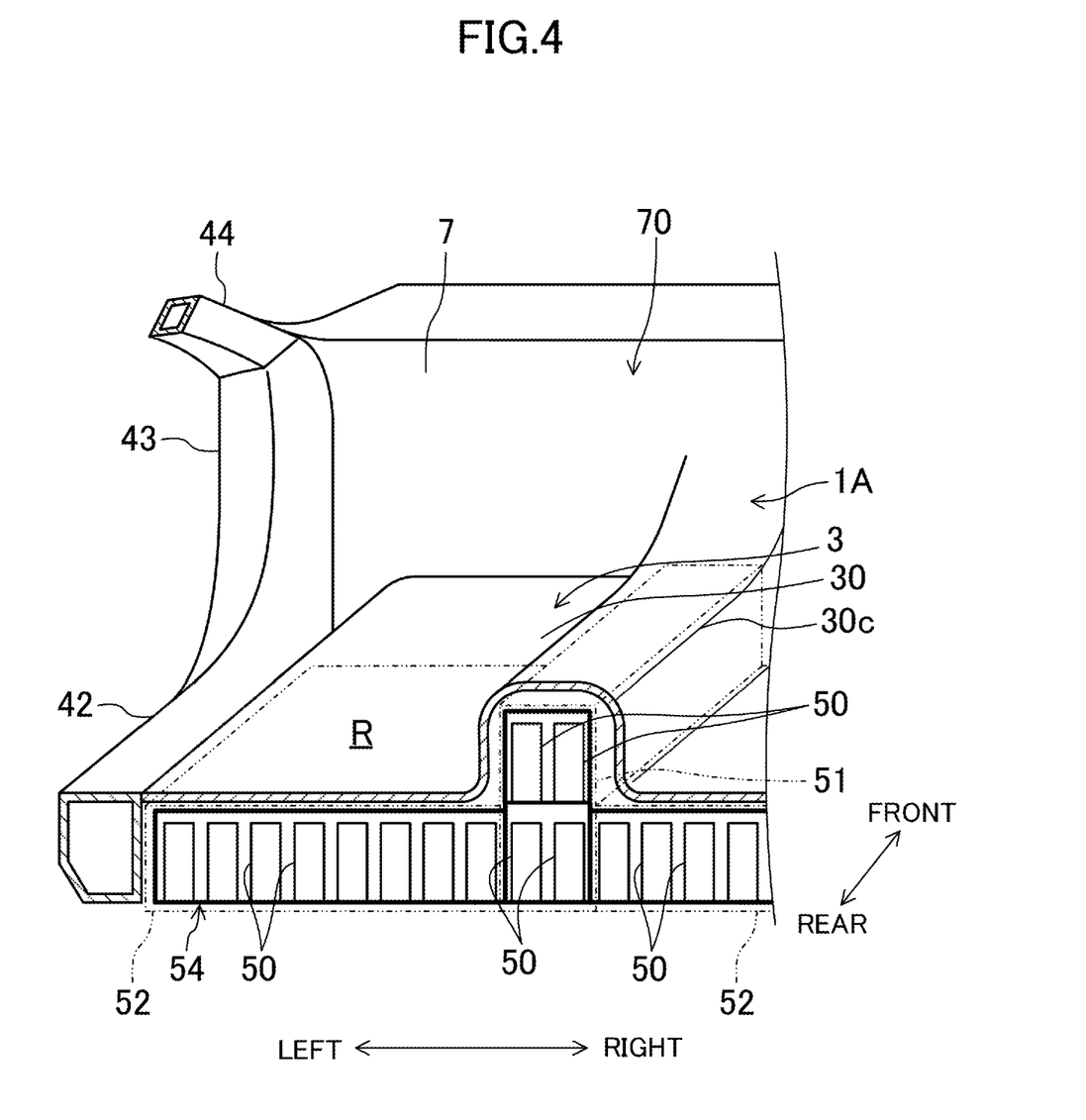
FIG. 4 is a perspective view of a front portion of a vehicle interior from the rear.

The vehicle body structure 1A of the motor vehicle 1 will be described more specifically. As indicated by broken lines in FIG. 1, at each of the right and left portions of the motor vehicle 1, there are a front door opening 40 to be opened or closed by the front door 5 and a rear door opening 41 to be opened or closed by the rear door 6. As shown in FIG. 3, the vehicle body structure 1A has a pair of right and left side sills 42 arranged so as to extend in the front-rear direction at both end portions of the floor panel 3 in the right-left direction. Further, as shown in FIG. 4, the vehicle body structure 1A also includes a pair of right and left hinge pillars 43 (only the left one is shown) arranged so as to extend in the up-down direction at both end portions of a front floor panel 30 forming a front portion of the floor panel 3. A lower portion of the hinge pillar 43 is connected to the vicinity of a front portion of the side sill 42, and the hinge pillar 43 extends upward from such a portion. A rear portion of the hinge pillar 43 is formed so as to be positioned rearward toward a lower portion of the hinge pillar 43. That is, the dimension of the hinge pillar 43 in the front-rear direction is set so as to be longer toward the lower portion of the hinge pillar 43. A lower end portion of the hinge pillar 43 extends to a position lower than a lower surface of the front floor panel 30 described later.

As shown in FIG. 4, a lower end portion of a front pillar 44 is connected to an upper portion of the hinge pillar 43. The front pillar 44 extends while being inclined so as to be positioned rearward toward the upper side, and is connected to a front portion of the roof 4. Further, as shown in FIG. 1, the vehicle body structure 1A includes a center pillar 45 extending upward from a middle portion of the side sill 42 in the front-rear direction. The front door opening 40 is formed by a rear edge portion of the hinge pillar 43, a lower edge portion of the front pillar 44, an upper edge portion of the side sill 42, a front edge portion of the center pillar 45, and the roof 4. The front door 5 is supported by the hinge pillar 43, and the rear door 6 is supported by the center pillar 45.

Further, the vehicle body structure 1A may include a rear pillar (not shown) that extends in the up-down direction at a portion away rearward from the center pillar 45. The rear door opening 41 is formed between the center pillar 45 and the rear pillar. The rear door 6 is omitted in some cases, and in these cases, the rear door opening 41 is also omitted.

As shown in FIG. 2, the brake pedal B is swingably provided at the dash panel 7. That is, in the vehicle interior R on the right side of the dash panel 7, a pedal bracket 11 is attached to a portion facing the driver seat 8. The pedal bracket 11 is provided away upward from an upper surface of the floor panel 3. A spindle 11a extending in the right-left direction is provided at the pedal bracket 11. An upper end portion of the brake pedal B is pivotably supported on the spindle 11a.

The brake pedal B extends downward from the portion supported by the spindle 11a. A lower end portion of the brake pedal B is a portion to be stepped on by an occupant. A rear end portion of a rod B1 is coupled to the brake pedal B. A front end portion of the rod B1 is connected to an input of a brake booster apparatus 12. Note that the front end portion of the rod B1 may be coupled to a brake force generation apparatus other than the brake booster apparatus 12.

Note that the support structure of the brake pedal B is not limited to one described above and the brake pedal B may be a so-called organ pedal type brake pedal although not shown in the figure. In this case, a lower portion of the brake pedal is swingably supported on the floor panel 3 through a spindle extending in the right-left direction.

Figure 5:
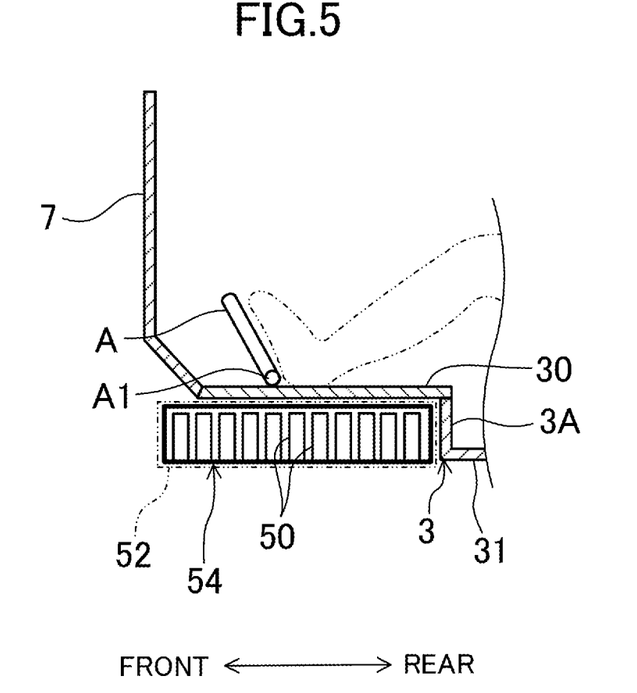
FIG. 5 is a partial cross-sectional view of the dash panel and the floor panel of the motor vehicle, FIG. 5 showing the position of an accelerator pedal.

FIG. 5 is a cross-sectional view of the dash panel 7 and the floor panel 3, and shows the position of an accelerator pedal A. The accelerator pedal A is of a so-called organ pedal type, and a lower portion of the accelerator pedal A is swingably supported to the floor panel 3 through a spindle μl extending in the right-left direction. Note that although not shown in the figure, the accelerator pedal A may be of a hanging type. In this case, an upper portion of the accelerator pedal A is swingably supported on the dash panel 7 via the spindle extending in the right-left direction. The motor vehicle 1 driven by the traction motor also includes a pedal to be operated upon acceleration, and such a pedal will be also referred to as an accelerator pedal in the present specification.

Although not shown in the figure, in a case where a manual transmission, whose gear ratio is changed by an occupant using an operation lever (not shown) provided in the vehicle interior R, is mounted, a pedal for operating a clutch is provided in the vehicle interior R. Normally, the accelerator pedal A is arranged at the rightmost position, the brake pedal B is arranged at the left of the accelerator pedal A, and a clutch pedal is arranged at the left of the brake pedal B.

Further, for example, in an instruction vehicle used for a motor vehicle driving course, an accelerator pedal and a brake pedal are also provided on a passenger seat side as in a driver seat side, although not shown in the figure. The present disclosure is also applicable to such an instruction vehicle.

(Configuration of Floor Panel)

Figure 6:
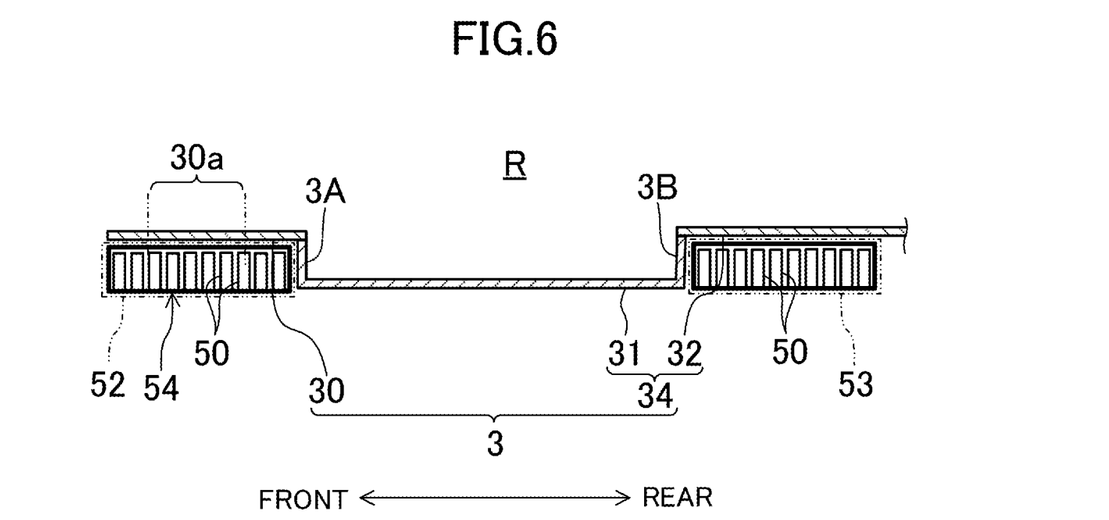
FIG. 6 is a cross-sectional view showing an exemplary structure of the floor panel.

As shown in FIG. 6, the floor panel 3 includes a front floor panel 30 and a seat-mounted floor panel 34. The front floor panel 30 and the seat-mounted floor panel 34 are formed by separate members, and are joined to each other to form the floor panel 3. Further, the seat-mounted floor panel 34 includes a first floor panel (a rear floor panel) 31 forming a front portion of the seat-mounted floor panel 34 and a second floor panel (a rear-seat floor panel) 32 forming a rear portion of the seat-mounted floor panel 34. The first floor panel 31 and the second floor panel 32 are separate members, and are joined to each other to form the seat-mounted floor panel 34.

As shown in FIGS. 3 and 4, a floor tunnel portion 30c is formed at the front floor panel 30 and the first floor panel 31. The floor tunnel portion 30c may be formed in such a manner that center portions of the front floor panel 30 and the first floor panel 31 in the right-left direction bulge upward, and for example, may be formed so as to continuously extend in the front-rear direction from the front portion of the front floor panel 30 to the rear portion of the first floor panel 31.

As shown in FIG. 2, the front floor panel 30 extends rearward from the lower end portion of the dash panel 7, and extends in the right-left direction. As shown in FIG. 6, a heel rest portion 30a on which a heel of the pedal operator operating the brake pedal B and the accelerator pedal A is placed is provided at the front floor panel 30. The heel rest portion 30a is a portion where the heel of the occupant is naturally placed when the occupant operates the accelerator pedal A or the brake pedal B. This portion varies to some extent according to the physique, driving postures, etc. of the occupant, but is generally an area (region) shown in FIG. 6. That is, the heel rest portion 30a can be defined as a continuous region from a portion away rearward from a front end portion of the front floor panel 30 to a portion away forward from a rear end portion of the front floor panel 30, and can also be a middle portion of the front floor panel 30 in the front-rear direction.

As shown in FIG. 2, the second floor panel 32 is a member provided away rearward from the front floor panel 30 and fixed to the rear seat 10. The rear seat 10 includes a rear-seat cushion portion 10a forming a seat surface and a rear-seat seat back portion 10b forming a back rest portion. The rear-seat cushion portion 10a is fixed to an upper surface of the second floor panel 32.

Although the second floor panel 32 is continuously formed at least from a portion corresponding to a front end portion to a portion corresponding to a rear end portion of the rear-seat cushion portion 10a, the second floor panel 32 may be further extended rearward beyond the rear end portion of the rear-seat cushion portion 10a. In this case, a rear seat of a second row or a luggage compartment for placing luggage can be provided at the rear of the rear seat 10.

As shown in FIG. 6, the first floor panel 31 extends from a rear portion of the front floor panel 30 to a front portion of the second floor panel 32. The first floor panel 31 is positioned lower than the front floor panel 30. That is, for example, the front floor panel 30 can be formed so as to extend substantially horizontally in the front-rear direction, and the first floor panel 31 can also be formed so as to extend substantially horizontally in the front-rear direction. In this case, since the front floor panel 30 is in a position higher than the first floor panel 31, the floor panel 3 includes a front plate portion 3A extending in the up-down direction from the rear portion of the front floor panel 30 to the front portion of the first floor panel 31. Since the front floor panel 30 and the first floor panel 31 are connected to each other through the front plate portion 3A, there is a step between the front floor panel 30 and the first floor panel 31.

Further, the second floor panel 32 may also be in such a shape that the second floor panel 32 extends substantially horizontally in the front-rear direction. The second floor panel 32 is positioned higher than the first floor panel 31. Thus, the floor panel 3 includes a rear plate portion 3B extending in the up-down direction from the front portion of the second floor panel 32 to the rear portion of the first floor panel 31. Since the second floor panel 32 and the first floor panel 31 are connected to each other through the rear plate portion 3B, there is a step between the second floor panel 32 and the first floor panel 31. Thus, the first floor panel 31 is positioned one step lower than the front floor panel 30 and the second floor panel 32. A difference in a height between the first floor panel 31 and each of the front floor panel 30 and the second floor panel 32 may be set to 5 cm or more, 10 cm or more, or 15 cm or more, for example. The front floor panel 30 and the second floor panel 32 may be at the same height, or the front floor panel 30 may be lower or higher than the second floor panel 32. Further, the front floor panel 30, the first floor panel 31, and the second floor panel 32 are not necessarily precisely horizontal, and may be inclined so as to be positioned downward toward the rear side. Further, only part of the front floor panel 30, the first floor panel 31, and the second floor panel 32 may be inclined, and the remaining part may be substantially horizontal. Further, the second floor panel 32 may be at the same height as that of the first floor panel 31.

The front plate portion 3A may be integrally formed with the front floor panel 30 or with the first floor panel 31. Alternatively, the front plate portion 3A may be formed separately from these floor panels 30, 31. The rear plate portion 3B may be integrally formed with the second floor panel 32 or with the first floor panel 31. Alternatively, the front plate portion 3A may be formed separately from these floor panels 31, 32. Further, the front plate portion 3A and the rear plate portion 3B may extend substantially vertically, or may be inclined or curved. For example, the front plate portion 3A may be inclined or curved so as to be positioned rearward toward the lower side, and the rear plate portion 3B may be inclined or curved so as to be positioned forward toward the lower side.

As shown in FIG. 2, the first floor panel 31 includes a first front-seat fixing portion (front seat fixing portion) 31a and a second front-seat fixing portion (rear seat fixing portion) 31b for fixing the front seat 8. The first front-seat fixing portion 31a is provided at the front of a center portion of the first floor panel 31 in the front-rear direction, and for example, includes a member fixed to the first floor panel 31 and formed long in the right-left direction. Similarly, the second front-seat fixing portion 31b also includes a member formed long in the right-left direction, and is provided a predetermined distance away rearward from the first front-seat fixing portion 31a. The configurations of the first front-seat fixing portion 31a and the second front-seat fixing portion 31b are not limited to the members as described above, and may be members formed in various shapes by plate members etc. Note that in this embodiment, the first front-seat fixing portion 31a is formed so as to be higher than the second front-seat fixing portion 31b. However, the heights of the first front-seat fixing portion 31a and the second front-seat fixing portion 31b may be the same as each other.

A rear-seat fixing portion 32a for fixing the rear seat 10 is provided at least at a front portion of the second floor panel 32. The rear-seat fixing portion 32a may be configured similarly to or differently from the front-seat fixing portions 31a, 31b. In a case where the second floor panel 32 and the first floor panel 31 are arranged at the same height, the front seat 8 and the rear seat 10 can be arranged at the same height.

(Front Seat)

The front seat 8 includes a front-seat cushion portion 8a, a front-seat seat back portion 8b, and a seat slide mechanism 8c configured to adjust the position of the front-seat cushion portion 8a in the front-rear direction. The front-seat cushion portion 8a is a portion forming a seat surface for a front seat occupant, and although not shown in the figure, includes, e.g., a seat frame, a cushion material, and a cover material. The front-seat seat back portion 8b is a portion forming a back rest portion for the front seat occupant, and although not shown in the figure, includes, e.g., a seat frame, a cushion material, and a cover material.

A lower portion of the front-seat seat back portion 8b is attached to a rear portion of the front-seat cushion portion 8a through a reclining mechanism 8d. The reclining mechanism 8d is typically well-known, and is a mechanism for fixing the front-seat seat back portion 8b at an optional inclination angle.

The seat slide mechanism 8c may be a typically well-known mechanism, and for example, includes a movable member 8e fixed to a lower portion of the front-seat cushion portion 8a and a rail 8f fixed to the first front-seat fixing portion 31a and the second front-seat fixing portion 31b on the first floor panel 31. The rail 8f is a member for guiding the front-seat cushion portion 8a in the front-rear direction, and extends in the front-rear direction. A front portion of the rail 8f is fixed to the first front-seat fixing portion 31a, and a rear portion of the rail 8f is fixed to the second front-seat fixing portion 31b. Since the first front-seat fixing portion 31a is higher than the second front-seat fixing portion 31b, the rail 8f is inclined so as to be positioned upward toward the front. The rail 8f may be substantially horizontal.

The movable member 8e is a member capable of moving relative to the rail 8f in the front-rear direction while being engaged with the rail 8f. The position of the movable member 8e with respect to the rail 8f in the front-rear direction can be an optional position within a predetermined range, and the movable member 8e can be locked to the rail 8f at such a position. Such a lock mechanism is also typically well-known, and for example, can be unlocked by, e.g., lever operation. Note that the seat slide mechanism 8c and the reclining mechanism 8d may be of an electric type using an electric motor.

Further, the height of the seat slide mechanism 8c can be set according to the height of the first floor panel 31, the height of the first front-seat fixing portion 31a, and the height of the second front-seat fixing portion 31b. In this embodiment, the height of the seat slide mechanism 8c is set such that the front floor panel 30 is at a position higher than the seat slide mechanism 8c when compared with the front floor panel 30.

(Battery)

As shown in FIG. 2, the motor vehicle 1 includes a plurality of batteries 50 that supply electric power to the traction motor M. In this embodiment, each battery 50 is a so-called battery cell, and may be a lithium-ion battery, an all-solid-state battery, or other secondary batteries, for example. Further, the battery 50 may be a battery pack housing a secondary battery.

For mounting the batteries 50, the vehicle body structure 1A has, as spaces (battery arrangement spaces) for arranging the batteries 50, a first battery arrangement portion 51, second battery arrangement portions 52, and rear battery arrangement portions 53 below the floor panel 3. The first battery arrangement portion 51 is a portion in which some of the plurality of batteries 50 are arranged, the second battery arrangement portions 52 are portions in which some other batteries 50 are arranged, and the rear battery arrangement portions 53 are portions in which the remaining batteries 50 are arranged.

The first battery arrangement portion 51 and the second battery arrangement portions 52 will be specifically described with reference to FIGS. 3 and 4. In FIGS. 3 and 4, the sizes and shapes of the first battery arrangement portion 51 and the second battery arrangement portions 52 are schematically indicated by virtual lines. The sizes and shapes of these arrangement portions may be larger or smaller than those shown in the figures. The first battery arrangement portion 51 is provided long in the front-rear direction from a center portion of the front floor panel 30 in the right-left direction to a center portion of the second floor panel 32 in the right-left direction through a center portion of the first floor panel 31 in the right-left direction.

On the other hand, the second battery arrangement portions 52 are provided outside the first battery arrangement portion 51 in the vehicle width direction below the front floor panel 30. More specifically, the second battery arrangement portions 52 are each positioned below the driver seat side (one side in the vehicle width direction) and the passenger seat side (the other side in the vehicle width direction) of the front floor panel 30. The second battery arrangement portion 52 on the driver seat side is provided inside the vicinity of the right hinge pillar 43 in the vehicle width direction. The dimension of such a second battery arrangement portion 52 in the right-left direction is set so as not to reach a portion immediately below the floor tunnel portion 30c from the vicinity of the right hinge pillar 43. As shown in FIG. 2, a lower portion of the hinge pillar 43 and at least part of the second battery arrangement portion 52 are positioned so as to overlap with each other as viewed from the side.

The second battery arrangement portion 52 on the passenger seat side is provided inside the vicinity of the left hinge pillar 43 in the vehicle width direction. The dimension of such a second battery arrangement portion 52 in the right-left direction is set so as not to reach a portion immediately below the floor tunnel portion 30c from the vicinity of the left hinge pillar 43. At least part of the second battery arrangement portion 52 on the passenger seat side also overlaps with a lower portion of the hinge pillar 43 as viewed from the side.

The hinge pillar 43 is a highly-rigid member because the hinge pillar 43 supports the front door 5 in an openable/closable manner. A lower end portion of the hinge pillar 43 is positioned in the vicinity of the front floor panel 30. For example, when an impact load acts laterally from the motor vehicle 1 (e.g., upon lateral collision), the load is transmitted to the vehicle body through the highly-rigid hinge pillar 43. At this time, since the hinge pillar 43 and the batteries 50 arranged in the second battery arrangement portions 52 overlap with each other as viewed from the side, the batteries 50 can be protected by the hinge pillar 43 and the input load on the batteries 50 can be reduced.

A front portion of the second battery arrangement portion 52 is at the same position as that of the front portion of the front floor panel 30 or immediately below the dash panel 7. A rear portion of the second battery arrangement portion 52 is at the same position as that of the rear portion of the front floor panel 30 or in the vicinity of the front plate portion 3A.

The first battery arrangement portion 51 is provided between the second battery arrangement portion 52 on the driver seat side and the second battery arrangement portion 52 on the passenger seat side, i.e., at a center portion in the vehicle width direction below the floor panel 3. Since the floor tunnel portion 30c is formed at the center portion of the floor panel 3 in the vehicle width direction, the first battery arrangement portion 51 is arranged such that the position thereof in the vehicle width direction corresponds to the floor tunnel portion 30c. Further, a region corresponding to the floor tunnel portion 30c and positioned below the floor panel 3 is a region inside in the vehicle width direction with respect to outer portions of the second battery arrangement portions 52 in the vehicle width direction. In other words, the second battery arrangement portions 52 are provided outside the floor tunnel portion 30c in the vehicle width direction.

Further, in this embodiment, a lower portion of the first battery arrangement portion 51 and a lower portion of the second battery arrangement portion 52 are set to the same height, but these portions may be at different heights. The first battery arrangement portion 51 is also arranged inside the floor tunnel portion 30c, and an upper portion of the first battery arrangement portion 51 is positioned in the vicinity of an upper portion of the floor tunnel portion 30c. As a result, the upper portion of the first battery arrangement portion 51 is positioned higher than the upper portions of the second battery arrangement portions 52. Thus, the dimension of the first battery arrangement portion 51 in the up-down direction is longer than the dimension of the second battery arrangement portion 52 in the up-down direction. Further, in the case of comparing the dimension in the vehicle width direction, the second battery arrangement portion 52 is longer than the first battery arrangement portion 51.

A relative positional relationship among the first battery arrangement portion 51 and the second battery arrangement portions 52, in other words, is that the second battery arrangement portions 52 are provided on both sides of the first battery arrangement portion 51 in the vehicle width direction. The second battery arrangement portion 52 on the driver seat side, the first battery arrangement portion 51, and the second battery arrangement portion 52 on the passenger seat side are continuous in the vehicle width direction.

As shown in FIG. 2, the rear battery arrangement portions 53 are also provided the driver seat side and the passenger seat side below the second floor panel 32. As in the second, battery arrangement portion 52, an upper portion of the first battery arrangement portion 51 is positioned higher than an upper portion of the rear battery arrangement portion 53. The first battery arrangement portion 51 is provided inside the floor tunnel portion 30c, and is provided to extend to a rear portion of the floor tunnel portion 30c in the floor tunnel portion 30c. A rear portion of the first battery arrangement portion 51 reaches below the second floor panel 32, and is positioned between the rear battery arrangement portions 53 on the driver seat side and the passenger seat side. Note that the rear battery arrangement portions 53 may be provided as necessary and may be omitted.

Figure 7:
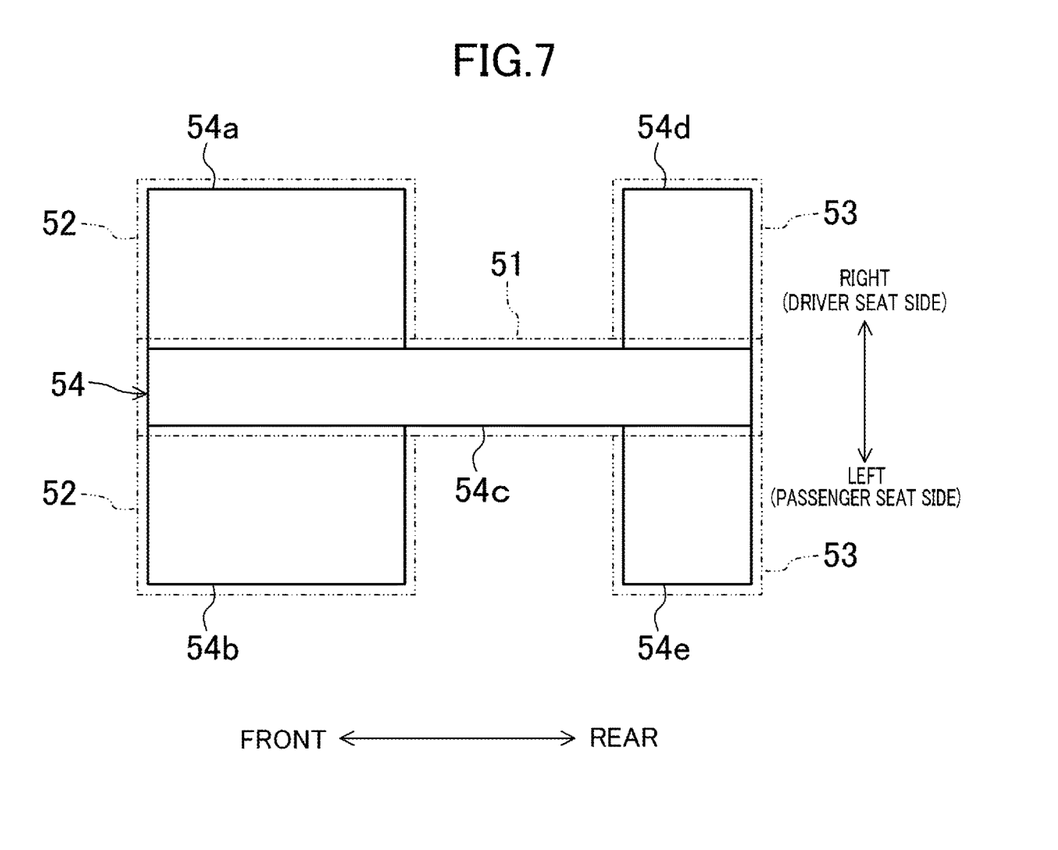
FIG. 7 is a plan view of a battery case.

The first battery arrangement portion 51, the second battery arrangement portions 52, and the rear battery arrangement portions 53 as described above are spaces for arranging the batteries 50. For arranging the batteries 50 in these arrangement spaces, there is a need for a battery holder for holding the batteries 50 at predetermined positions. As an example of the battery holder, a battery case 54 for housing the batteries 50 is used. Thus, the vehicle body structure 1A includes the battery case 54 having a shape as shown in FIG. 7. The battery case 54 is fixed to, e.g., at least one of the floor panel 3 or the side sill 42, and is integrated with the vehicle body. Examples of members forming the battery case 54 may include a steel plate and an extruded material, and these members form the single battery case 54. The term "single" means that the battery case 54 is one piece as a structure before fixed to the vehicle body and, even if the battery case 54 is dividable into a plurality of members, these members are integrated so as not to be separated immediately before these members are fixed to the vehicle body on a manufacturing line for the motor vehicle 1, for example. The batteries 50 and the battery case 54 may be collectively referred to as a battery unit, for example.

A reinforcement member etc. are provided inside or outside the battery case 54. With these members, the rigidity of the battery case 54 can be enhanced. By fixing the highly-rigid battery case 54 to the floor panel 3 or the side sill 42 as shown in FIGS. 3 and 4, the rigidity of the battery case 54 contributes to enhancement of the rigidity of the vehicle body. A fixing structure of the battery case 54 is not particularly limited. For example, a fixing structure using a fastening member such as a bolt, a nut, or a screw can be adopted.

As shown in FIG. 7, the battery case 54 includes a right front housing portion 54a corresponding to the second battery arrangement portion 52 on the driver seat side and the front side, a left front housing portion 54b corresponding to the second battery arrangement portion 52 on the passenger seat side and the front side, a center housing portion 54c corresponding to the first battery arrangement portion 51, a right rear housing portion 54d corresponding to the rear battery arrangement portion 53 on the driver seat side, and a left rear housing portion 54e corresponding to the rear battery arrangement portion 53 on the passenger seat side. The first floor panel 31 (shown in FIG. 2) is positioned between the right front housing portion 54a and the right rear housing portion 54d and between the left front housing portion 54b and the left rear housing portion 54e. The right rear housing portion 54d and the left rear housing portion 54e may be omitted. Further, the housing portion 5c may be arranged within the first battery arrangement portion 51, or may have the same shape as that of the first battery arrangement portion 51. Further, the housing portion 54a, 54b may be arranged within the second battery arrangement portion 52, or may have the same shape as that of the second battery arrangement portion 52. Further, the housing portion 54d, 54e may be arranged within the rear battery arrangement portion 53, or may have the same shape as that of the rear battery arrangement portion 53.

The right front housing portion 54a is formed so as to protrude rightward from a right portion of the center housing portion 54c. As a result, the right portion of the right front housing portion 54a is positioned in the vicinity of the lower portion of the right hinge pillar 43. Further, the left front housing portion 54b is formed so as to protrude leftward from a left portion of the center housing portion 54c. As a result, the left portion of the left front housing portion 54b is positioned in the vicinity of the lower portion of the left hinge pillar 43.

Further, the upper portion of the center housing portion 54c is positioned higher than the upper portions of the right front housing portion 54a, the left front housing portion 54b, the right rear housing portion 54d, and the left rear housing portion 54e. Since the center housing portion 54c is formed higher, the batteries 50 can be housed in the center housing portion 54c so as to form a plurality of stages in the up-down direction.

The batteries 50 are housed in the housing portions 54a to 54e in a similar manner. Thus, a space below the front floor panel 30, a space below the second floor panel 32, and the internal space of the floor tunnel portion 30c can be effectively used as spaces for housing the batteries 50, and the capacity for mounting the batteries 50 can be increased.

Since the right front housing portion 54a is positioned in the second battery arrangement portion 52, the internal space of the right front housing portion 54a is the second battery arrangement portion 52. Further, since the left front housing portion 54b is also positioned in the second battery arrangement portion 52, the internal space of the left front housing portion 54b is also the second battery arrangement portion 52. Since the center housing portion 54c is positioned in the first battery arrangement portion 51, the internal space of the center housing portion 54c is the first battery arrangement portion 51. As described above, the single battery case 54 includes the second battery arrangement portion 52 on the driver seat side, the first battery arrangement portion 51, and the second battery arrangement portion 52 on the passenger seat side.

Since the right front housing portion Ma and the right rear housing portion 54d are separated from each other in the front-rear direction, a space having no batteries 50 is formed between the right front housing portion 54a and the right rear housing portion 54d. This space can be used to lower the position of the front seat 8.

Although not shown in the figure, the second battery arrangement portion 52 may be provided inside the vicinity of the center pillar 45 (shown in FIG. 1) in the vehicle width direction below the floor panel 30. Further, although not shown in the figure, the second battery arrangement portion 52 may be provided inside the vicinity of the rear pillar in the vehicle width direction below the floor panel 30.

The structure, shape, etc. of the battery case 54 may be changed according to the type of battery 50. In the battery case 54, a cooling unit, a heating unit, etc. (both not shown in the figure) for adjusting the temperatures of the batteries 50 can be provided.

The lower portions of the first battery arrangement portion 51 and the second battery arrangement portions 52 may be at the substantially same height as that of the lower surface of the first floor panel 31 or at a position higher than the lower surface of the first floor panel 31 such that the minimum ground clearance of the motor vehicle 1 is not low.

Figure 8:
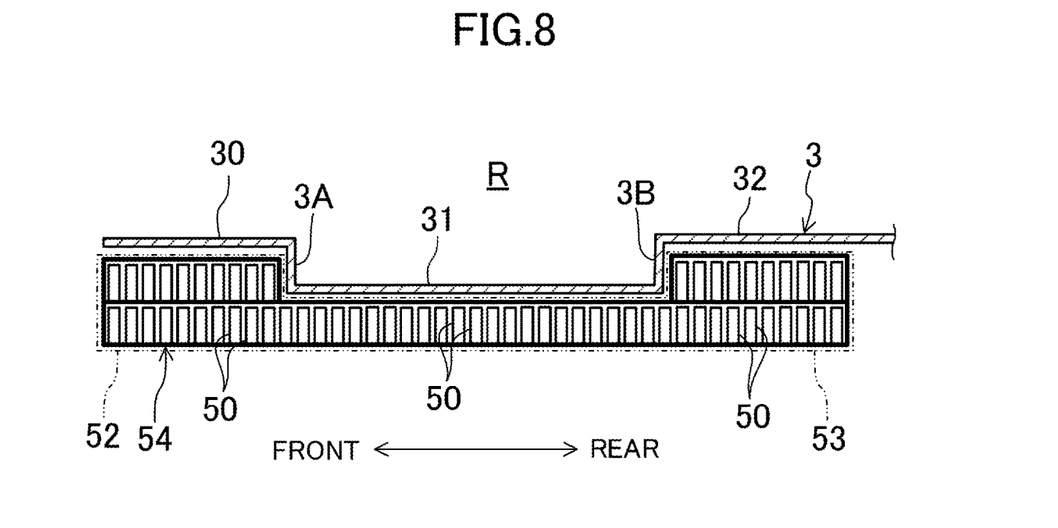
FIG. 8 is a view corresponding to FIG. 6, which shows an example where the capacity for mounting batteries is further increased.

As shown in FIG. 8, the lower portions of the second battery arrangement portions 52 and the rear battery arrangement portions 53 may be lower than the lower surface of the first floor panel 31. As a result, the capacity for mounting the batteries 50 can be further increased. Similarly, the lower portion of the first battery arrangement portion 51 may be lower than the lower surface of the first floor panel 31.

(Posture of Front Seat Occupant and Pedal Operation)

Figure 9:
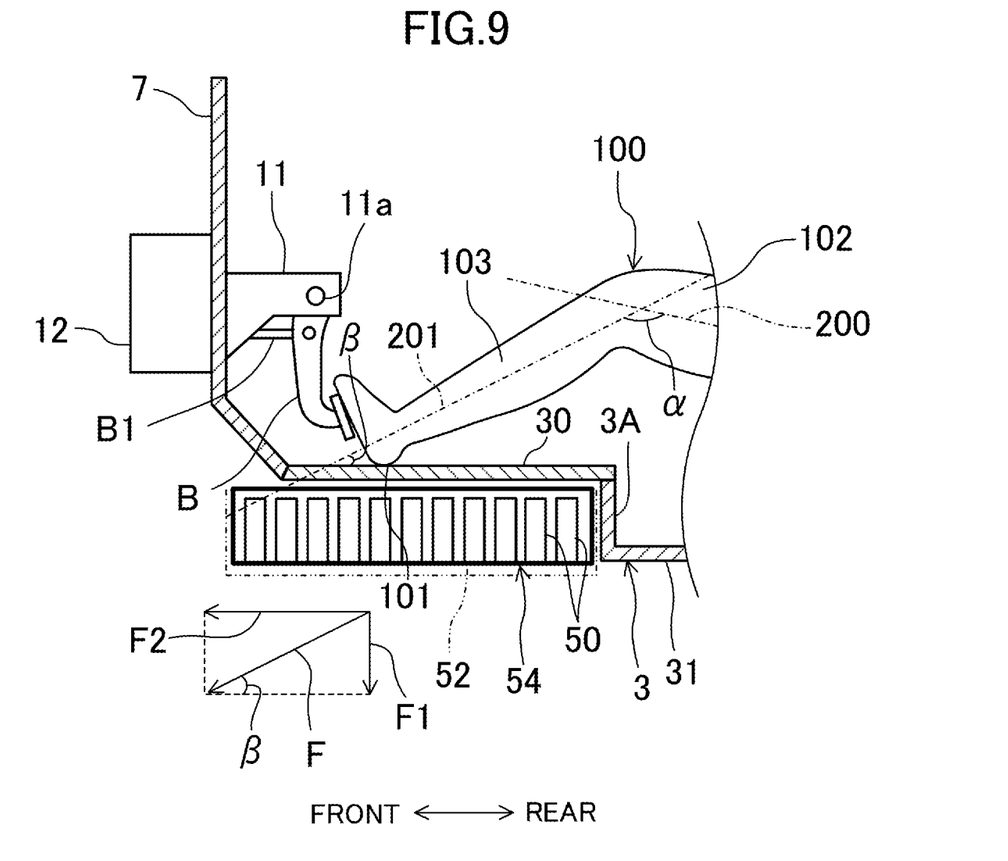
FIG. 9 is a view for describing pedal operation.

FIG. 9 is a view showing a lower limb 100 of the front seat occupant (a pedal operator) seated on the front seat 8, the floor panel 3, the dash panel 7, the brake pedal B, and the vicinity thereof. In this embodiment, the hip point of the pedal operator can be lowered. Lowering the hip point of the pedal operator means that the seating position of the pedal operator is lowered. This lowers the height of the center of gravity of the vehicle while the occupant is on-board.

Further, since the front floor panel 30 on which a heel 101 of the pedal operator is placed is positioned higher than the first floor panel 31, the heel 101 of the pedal operator is placed at a position higher as compared to a general operation posture. Such a layout leads to such a posture that an upper leg 102 and a lower leg 103 of the pedal operator are widely open. In FIG. 9, a reference numeral 200 indicates the center line of the upper leg 102 of the pedal operator whereas a reference numeral 201 indicates the center line of the lower leg 103, and a difference in a height between the front floor panel 30 and the first floor panel 31 is set such that an angle (an opening angle α between the upper leg 102 and the lower leg 103) between the center lines 200, 201 falls within a range of 125° to 150°.

Setting the height difference as described above results in a smaller angle (angle β between the center line 201 and the front floor panel 30) between the lower leg 103 and the front floor panel 30. This decreases component force, which is input to the heel 101 upon pedal operation, in the up-down direction, and improves the operability of the brake pedal B. More specifically, when the pedal operator steps on the brake pedal B, the heel 101 causes obliquely-downward force F to act on the front floor panel 30. When divided into vertical force and horizontal force, the force F is divided into force F1 and force F2. Since the angle β is small as described above, the component force F1, which is input from the heel 101, in the up-down direction is reduced. This allows, e.g., the quick and accurate operation of switching the pedal to be stepped on from the brake pedal B to the accelerator pedal A or from the accelerator pedal A to the brake pedal B. As a result, the operability of the pedals A, B is improved.

(Comfort of Rear Seat Occupant)

Note that this embodiment can improve the comfort of the rear seat occupant. As shown in FIG. 2, since the second floor panel 32 to which the rear seat 10 is attached is positioned higher than the first floor panel 31, the occupant on the rear seat 10 is seated at a relatively-high position, which improves the field of view. The feet of the rear seat occupant are placed on the first floor panel 31. Since the first floor panel 31 is positioned lower than the second floor panel 32, a wide foot space for the rear seat occupant is ensured particularly in the height direction.

(Features and Advantages of Embodiment)

As described above, according to this embodiment, the batteries 50 can be mounted in all of the first battery arrangement portion 51 and the second battery arrangement portions 52. In this case, since the upper portion of the first battery arrangement portion 51 at the center portion in the vehicle width direction is positioned higher than the upper portion of the second battery arrangement portion 52, the number of batteries mountable in the first battery arrangement portion 51 can be increased, and accordingly, the capacity for mounting the batteries 50 can be increased. In this case, the center portion in the vehicle width direction corresponds to, e.g., a portion between the driver seat and the passenger seat, and therefore, even if the height of the first battery arrangement portion 51 at this portion is high, it is less likely to feel the internal space of the vehicle interior as a narrow space. On the other hand, the second battery arrangement portion 52 corresponds to the outside of the first battery arrangement portion 51 in the vehicle width direction, i.e., the portion where the front seats 8, 9 are arranged and the portion where the feet of the rear seat occupant are placed, and therefore, although it is likely to feel the internal space of the vehicle interior as a narrow space if the height of such a portion is high, a sufficient internal space of the vehicle interior can be ensured because the height of the second battery arrangement portion 52 is relatively low in the present embodiment.

OTHER EMBODIMENTS

The above-described embodiments are merely examples in nature in all respects, and the scope of the present disclosure should not be interpreted in a limited manner. Further, variations and modifications of equivalents of the patent claims are intended to fall within the scope of the present disclosure.

Figure 10:
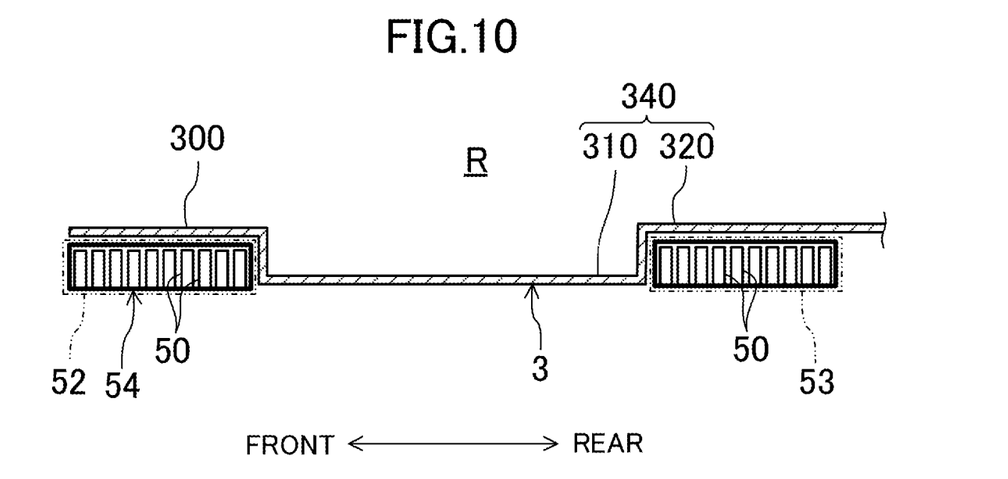
FIG. 10 is a view corresponding to FIG. 6, which relates to a variation of the embodiment.

For example, as in a variation of the embodiment shown in FIG. 10, the floor panel 3 may be a single piece from the front portion to the rear portion. Specifically, the floor panel 3 of the variation includes a front panel portion 300 for placing the heel of the pedal operator and a seat-mounted panel portion 340. The seat-mounted panel portion 340 is provided at the rear of the front panel portion 300, and includes a first panel portion (a rear panel portion) 310 to which at least the front seat 8 is attached and a second panel portion (a rear-seat panel portion) 320.

The front panel portion 300 is equivalent to the above-described front floor panel 30, the first panel portion 310 is equivalent to the above-described first floor panel 31, and the second panel portion 320 is equivalent to the above-described second floor panel 32. In this variation, features and advantages similar to those of the above-described embodiment can be also obtained. Alternatively, the front panel portion 300 and the first panel portion 310 may be integrally formed, and the second panel portion 320 may be a separate member. Alternatively, the second panel portion 320 and the first panel portion 310 may be integrally formed, and the front panel portion 300 may be a separate member.

As described above, the vehicle body structure of the present disclosure is applicable to a motor vehicle having a floor panel, for example.

What is claimed is:

1. A vehicle body structure of a motor vehicle comprising:
   a floor panel forming a floor surface of a vehicle interior;
   a traction motor; and
   batteries that supply electric power to the traction motor,
   the floor panel including
   a front floor panel provided on a vehicle front side, and
   a rear floor panel provided at a rear of the front floor panel,
   the front floor panel being positioned higher than the rear floor panel,
   a first battery arrangement portion in which the batteries are arranged being provided to extend in a vehicle front-rear direction at a center portion of the floor panel in the vehicle width direction,
   a second battery arrangement portion in which the batteries are arranged being provided outside the first battery arrangement portion in a vehicle width direction below the front floor panel,
   an upper portion of the first battery arrangement portion being positioned higher than an upper portion of the second battery arrangement portion.

2. The vehicle body structure of claim 1, further comprising:
   a pair of right and left side sills arranged to extend in a front-rear direction at both end portions of the floor panel in a vehicle width direction; and
   a pair of right and left pillars each extending upward from the pair of right and left side sills, wherein
   the second battery arrangement portion is provided inside a vicinity of the pillars in the vehicle width direction below the floor panel.

3. The vehicle body structure of claim 2, wherein
   a heel rest portion for placing a heel of a pedal operator operating a pedal provided at the motor vehicle is provided on the front floor panel.

4. The vehicle body structure of claim 3, further comprising:
   a floor tunnel portion bulging upward at a center portion of the floor panel in the vehicle width direction, wherein
   the first battery arrangement portion is provided inside the floor tunnel portion.

5. The vehicle body structure of claim 4, wherein
   the floor panel includes a rear-seat-side floor panel provided at a rear of the rear floor panel and fixed to a rear seat,
   a rear battery arrangement portion in which the batteries are arranged is provided below the rear-side-side floor panel, and
   an upper portion of the first battery arrangement portion is positioned higher than an upper portion of the rear battery arrangement portion.

6. The vehicle body structure of claim 5, wherein
   a rear portion of the first battery arrangement portion extends to the rear battery arrangement portion.

7. The vehicle body structure of claim 2, further comprising:
   a floor tunnel portion bulging upward at a center portion of the floor panel in the vehicle width direction, wherein
   the first battery arrangement portion is provided inside the floor tunnel portion.

8. The vehicle body structure of claim 2, wherein
   the floor panel includes a rear-seat-side floor panel provided at a rear of the rear floor panel and fixed to a rear seat,
   a rear battery arrangement portion in which the batteries are arranged is provided below the rear-side-side floor panel, and
   an upper portion of the first battery arrangement portion is positioned higher than an upper portion of the rear battery arrangement portion.

9. The vehicle body structure of claim 3, wherein
   the floor panel includes a rear-seat-side floor panel provided at a rear of the rear floor panel and fixed to a rear seat,
   a rear battery arrangement portion in which the batteries are arranged is provided below the rear-side-side floor panel, and
   an upper portion of the first battery arrangement portion is positioned higher than an upper portion of the rear battery arrangement portion.

10. The vehicle body structure of claim 1, wherein
    a heel rest portion for placing a heel of a pedal operator operating a pedal provided at the motor vehicle is provided on the front floor panel.

11. The vehicle body structure of claim 1, further comprising:
    a floor tunnel portion bulging upward at a center portion of the floor panel in the vehicle width direction, wherein
    the first battery arrangement portion is provided inside the floor tunnel portion.

12. The vehicle body structure of claim 1, wherein
    the floor panel includes a rear-seat-side floor panel provided at a rear of the rear floor panel and fixed to a rear seat,
    a rear battery arrangement portion in which the batteries are arranged is provided below the rear-side-side floor panel, and
    an upper portion of the first battery arrangement portion is positioned higher than an upper portion of the rear battery arrangement portion.

13. A vehicle body structure of a motor vehicle comprising:
    a floor panel forming a floor surface of a vehicle interior;
    a traction motor; and
    batteries that supply electric power to the traction motor,
    the floor panel including
    a front panel portion provided on a vehicle front side, and
    a rear panel portion provided at a rear of the front panel portion,
    the front panel portion being positioned higher than the rear panel portion,
    a first battery arrangement portion in which the batteries are arranged being provided to extend in a vehicle front-rear direction at a center portion of the floor panel in the vehicle width direction,
a second battery arrangement portion in which the batteries are arranged being provided outside the first battery arrangement portion in a vehicle width direction below the front panel portion,
an upper portion of the first battery arrangement portion being positioned higher than an upper portion of the second battery arrangement portion.

* * * * *